(No Model.)
N. B. GREGG.
APPARATUS FOR THE MANUFACTURE OF RED LEAD.
No. 255,970. Patented Apr. 4, 1882.
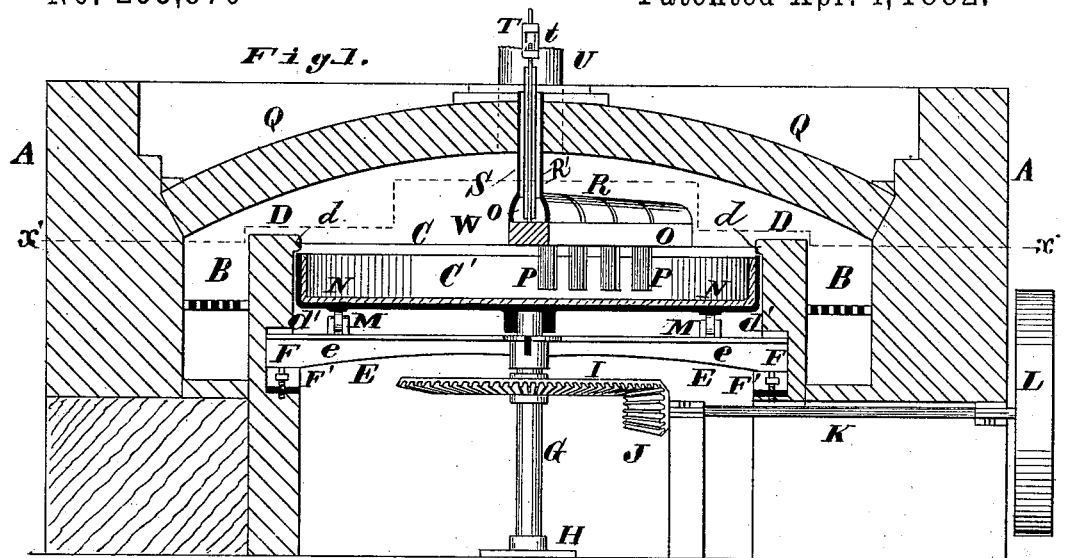
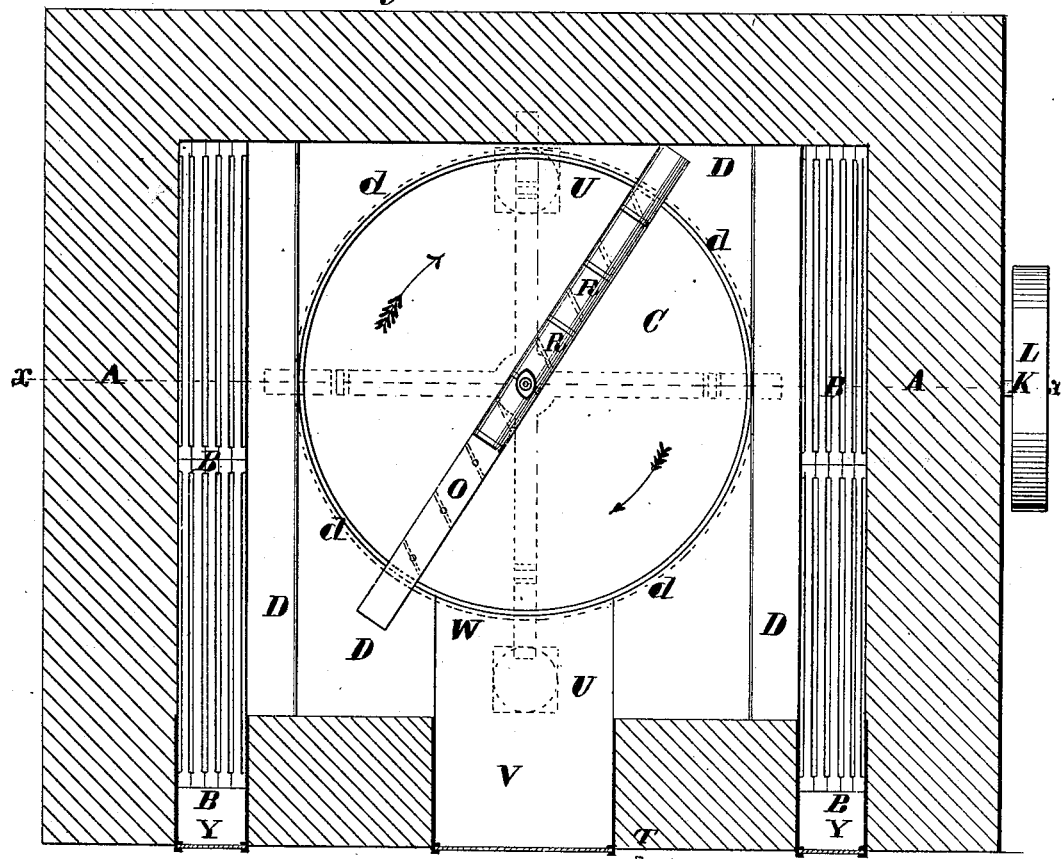
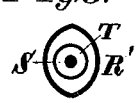
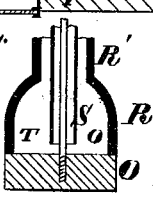
Attest:
Charles Pickles
Geo. H. Knight
Inventor:
Norris B. Gregg
By Knight Bros.
Attys

UNITED STATES PATENT OFFICE.

NORRIS B. GREGG, OF ST. LOUIS, MISSOURI.

APPARATUS FOR THE MANUFACTURE OF RED LEAD.

SPECIFICATION forming part of Letters Patent No. 255,970, dated April 4, 1882.

Application filed December 20, 1880. (No model.)

*To all whom it may concern:*

Be it known that I, NORRIS B. GREGG, of the city of St. Louis, in the State of Missouri, have invented a certain new and useful Improvement in Apparatus for the Manufacture of Red Lead, of which the following is a full, clear, and exact description, reference being had to the accompanying drawings, forming part of this specification.

Figure 1 is a vertical section of my apparatus at $x\ x$. Fig. 2 is a horizontal section at $x'\ x'$. Fig. 3 is a detail horizontal section at $x'\ x'$, enlarged. Fig. 4 is a detail vertical section at $x\ x$, enlarged.

A is a reverberatory furnace with two fire-places, B, upon opposite sides of the rotary converting-pan C. D are bridge-walls extending above the level of the pan C and overhanging the edge of the same at $d$, so as to prevent the overheating of the pan.

It will be seen that the bridge-walls are extended around the pan, leaving a small space, $d'$, for the ascent of air between the pan and the wall to cool the pan.

E is a bridge-frame or spider, whose legs rest on tram-screws F, turning in bearing-nuts F', for the leveling or vertical adjustment of the spider.

The pan C is supported at the center upon a vertical shaft, G, having journal-bearing in the center of the spider and in a step-box, H. The shaft G carries a bevel cog-wheel, I, engaged by a bevel-pinion, J, on the drive-shaft K, which carries a belt-pulley, L. On the arms $e$ of the spider are standards giving bearing to the wheels M, which assist in sustaining the pan C.

N is a circular wheel-rail upon the bottom of the pan. The pan I have made of iron, with a lining, C', of graphite or fire-clay.

O is a bar extending diametrically over the pan with its ends supported on the brick-work at D.

P are the stirrers or flights, which extend downward from the bar to near the bottom of the pan. I prefer to incline them in such manner that they shall turn the lead inward, and the flight of each half of the bar shall demolish the ridges formed by those at the other end, so as to keep the lead continually stirred and present all portions equally to the action of the heat deflected from the dome or arch Q. The centrifugal influence upon the material in the rotating pan C causes it to move toward the periphery of the pan, and the flights or stirrers are preferably so inclined to move it toward the center to prevent its accumulation at the outer portion of the pan.

The upper side of the bar O is protected from the direct action of the deflected heat from the arch Q by semi-cylindrical tiles R, of graphite, fire-brick, or other material capable of withstanding the heat, and thus an air passage or chamber, $o$, is formed between the top of the bar and the tiles. At the center of the chamber $o$ is a flue, R', extending vertically upward through the arch Q, so as to discharge the heated air from the chamber. This chimney I prefer to make of the same refractory material as the tiles R.

S is an air-pipe placed axially in the flue R' and open at both ends. Its purpose is to supply air to the lower part of the chamber $o$, said air, after having become heated, escaping through the flue R', as aforesaid.

The center of the bar O is sustained by a rod, T, which is attached at the lower end to the bar and at the upper end to any fixed object. The rod is provided with a screw-swivel, $t$, by which its length may be adjusted, as required. The rod T extends through the tube S.

U are chimneys, one of which is shown in Fig. 1, and whose positions are shown by dotted lines in Fig. 2. In Fig. 2 some of the tiles R are absent, showing the top of bar O.

V is the entrance to the converting-chamber W. Y Y are the fire-doors.

I am aware that in the manufacture of iron adjustable and revolving pans, stirrers, and overhanging bridge-walls have been used. Such devices I do not claim broadly, because as constructed they are not adapted to the art of manufacturing red lead. I could not as previously made use them satisfactorily in my process.

Having thus described my invention, what I claim as new, and desire to secure by Letters Patent, is—

1. The combination, with the rotating pan

C and wall D $d$, the sides of the pan and the wall being so constructed relatively to each other as to form an annular air-passage, $d'$, of the adjustable spider E, for regulating the flow of air through the passage $d'$, and the supporting-wheels M, substantially as set forth.

2. The combination, with the fixed stirrer-bar O, of the semi-cylindrical covering-tiles R, vertical flue R', and induction air-tube S, as and for the purposes set forth.

NORRIS B. GREGG.

Witnesses:
SAML. KNIGHT,
R. D. THORNBURGH.